(12) United States Patent
Calzolari et al.

(10) Patent No.: US 11,987,454 B2
(45) Date of Patent: May 21, 2024

(54) ASSEMBLY FOR TRANSPORTING DIFFERENT TYPES OF ARTICLES OF THE SMOKING PRODUCTS MANUFACTURING INDUSTRY AND RELATIVE PLANT

(71) Applicant: G.D SOCIETA' PER AZIONI, Bologna (IT)

(72) Inventors: Luca Calzolari, Bologna (IT); Michele Ferrari, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 5 days.

(21) Appl. No.: 17/627,509

(22) PCT Filed: Jul. 16, 2020

(86) PCT No.: PCT/IB2020/056700
§ 371 (c)(1),
(2) Date: Jan. 14, 2022

(87) PCT Pub. No.: WO2021/009707
PCT Pub. Date: Jan. 21, 2021

(65) Prior Publication Data
US 2022/0281693 A1    Sep. 8, 2022

(30) Foreign Application Priority Data

Jul. 16, 2019 (IT) .......................... 102019000011823

(51) Int. Cl.
*B65G 47/51* (2006.01)
*A24C 5/35* (2006.01)
*B65G 21/14* (2006.01)

(52) U.S. Cl.
CPC ................ *B65G 47/51* (2013.01); *A24C 5/35* (2013.01); *B65G 21/14* (2013.01); *B65G 2201/0226* (2013.01)

(58) Field of Classification Search
None
See application file for complete search history.

(56) References Cited

U.S. PATENT DOCUMENTS

| 4,813,527 A | * | 3/1989 | Carter | ................ | B65G 47/5122 |
| | | | | | 198/607 |
| 5,103,960 A | * | 4/1992 | Brown | ............... | B65G 47/5195 |
| | | | | | 198/347.1 |

(Continued)

FOREIGN PATENT DOCUMENTS

| FR | 2766803 A1 | 2/1999 |
| GB | 2178715 A | 2/1987 |

(Continued)

OTHER PUBLICATIONS

International Search Report and Written Opinion for Corresponding International Application No. PCT/IB2020/056700 dated Oct. 21, 2020.

(Continued)

*Primary Examiner* — Kavel Singh
(74) *Attorney, Agent, or Firm* — MARSHALL, GERSTEIN & BORUN LLP

(57) ABSTRACT

Transport assembly of the smoking products manufacturing industry; the transport assembly comprises: a first conveying system for feeding components of the smoking products along a first conveying path to a first input station of a first manufacturing machine; and a second conveying system for conveying articles obtained from the components along a second conveying path from a first output station of the first machine to an input station of a second manufacturing machine (for example, a packaging machine); the first (Continued)

conveying system is configured to change the length of a stretch of the first conveying path; the second conveying system is configured to change the length of a stretch of the second conveying path; the mentioned stretches of the first path and of the second path are arranged overlapping one another and/or side by side.

14 Claims, 11 Drawing Sheets

(56) References Cited

U.S. PATENT DOCUMENTS

| | | | | |
|---|---|---|---|---|
| 7,163,098 B2* | 1/2007 | Ferrari | ............... | B65B 19/30 |
| | | | | 198/347.1 |
| 7,163,099 B2* | 1/2007 | Mueller | ............ | B65G 47/5122 |
| | | | | 198/347.4 |
| 7,219,788 B2* | 5/2007 | Tuck | ............ | B65G 47/5122 |
| | | | | 198/347.4 |
| 7,588,139 B1* | 9/2009 | Campbell, III | ........ | B65G 21/14 |
| | | | | 198/606 |
| 8,317,010 B2 | 11/2012 | Riedel et al. | | |
| 8,327,996 B2 | 12/2012 | Gielniewski et al. | | |
| 8,469,181 B2 | 6/2013 | Figarski et al. | | |
| 9,090,406 B2* | 7/2015 | Lopez | ............... | B65G 1/133 |
| 2015/0289559 A1 | 10/2015 | Gianese et al. | | |

FOREIGN PATENT DOCUMENTS

| | | |
|---|---|---|
| GB | 2326146 A | 12/1998 |
| RU | 2444964 C1 | 3/2012 |
| RU | 2482779 C1 | 5/2013 |
| RU | 2500313 C2 | 12/2013 |

OTHER PUBLICATIONS

Office Action, Russian patent application No. 2022103792, dated Oct. 7, 2022.

* cited by examiner

ASSEMBLY FOR TRANSPORTING DIFFERENT TYPES OF ARTICLES OF THE SMOKING PRODUCTS MANUFACTURING INDUSTRY AND RELATIVE PLANT

CROSS-REFERENCE TO RELATED APPLICATIONS

This Patent Application is a U.S. national phase of International Patent Application No. PCT/I62020/056700 filed Jul. 16, 2020, which claims the benefit of priority from Italian patent application no. 102019000011823 filed on Jul. 16, 2019, the respective disclosures of which are each incorporated herein by reference in their entireties.

TECHNICAL FIELD

The present invention relates to a transport assembly and a plant of the smoking products manufacturing industry.

The term "smoking products" refers to bar-shaped articles of the tobacco industry such as, for example, pieces of tobacco, pieces of filtering material, cigarettes, heat-not-burn articles.

The present invention finds an advantageous application for a system for conveying cigarettes from a packaging machine to a packing machine, to which part of the following disclosure makes explicit reference without thereby losing its generality.

BACKGROUND OF THE INVENTION

In the field of the smoking products manufacturing industry, plants are known comprising a first conveying system for feeding articles to a first machine, which treats them so as to obtain treated articles, and for conveying the treated articles to a second machine.

During operation, the operating speeds of the two machines can be variable in the absolute sense and one relative to the other. To compensate for the temporary variations in productivity of the two machines, a variable capacity store can be provided both between the two machines and upstream of the two machines.

However, the variable capacity stores currently on the market are relatively complex, expensive, and bulky.

For example, a non-limiting reference can be made to a conventional cigarette production plant comprising a making machine (maker) that produces individual cigarettes, a packing machine that produces packs of cigarettes, and a transport assembly that feeds the making machine and connects the making machine to the packing machine for feeding a continuous flow of cigarettes from an output of the making machine to an input of the packing machine.

Generally, the transport assembly comprises an elevator that receives the continuous flow of cigarettes from an output of the making machine and vertically lifts the continuous flow of cigarettes, a horizontal conveyor which is arranged at a relatively high elevation (generally over two and a half meters) so as not to interfere with the underlying passage of people and receives the continuous flow of cigarettes from the elevator, and a descent channel which is arranged at the end of the horizontal conveyor and feeds the continuous flow of cigarettes to an input of the packing machine (in particular at an input of a hopper of the packing machine).

To compensate for the temporary differences in productivity of the two machines, a variable capacity cigarette store can be coupled to the horizontal conveyor which stores (absorbs) a given quantity of cigarettes when the making machine is more productive than the packing machine (i.e. when the packaging machine produces a greater quantity of cigarettes than a quantity of cigarettes packed by the packing machine) and releases a given quantity of cigarettes when the packaging machine is less productive than the packing machine (i.e. when the making machine produces a smaller quantity of cigarettes compared to a quantity of cigarettes packed by the packing machine).

However, as already mentioned, the variable capacity stores for cigarettes currently on the market are relatively complex, expensive, and bulky.

The object of the present invention is to provide a transport assembly and a plant, which allow to overcome, at least partially, the drawbacks of the prior art and are, at the same time, easy and inexpensive to manufacture.

SUMMARY

In accordance with the present invention, a transport assembly and a plant are provided according to what is claimed in the following independent claims and, preferably, in any one of the claims depending directly or indirectly on the aforementioned independent claims.

BRIEF DESCRIPTION OF THE FIGURES

The present invention will now be described with reference to the attached drawings, which illustrate a non-limiting example of embodiment, wherein.

DETAILED DESCRIPTION

Figure 1:
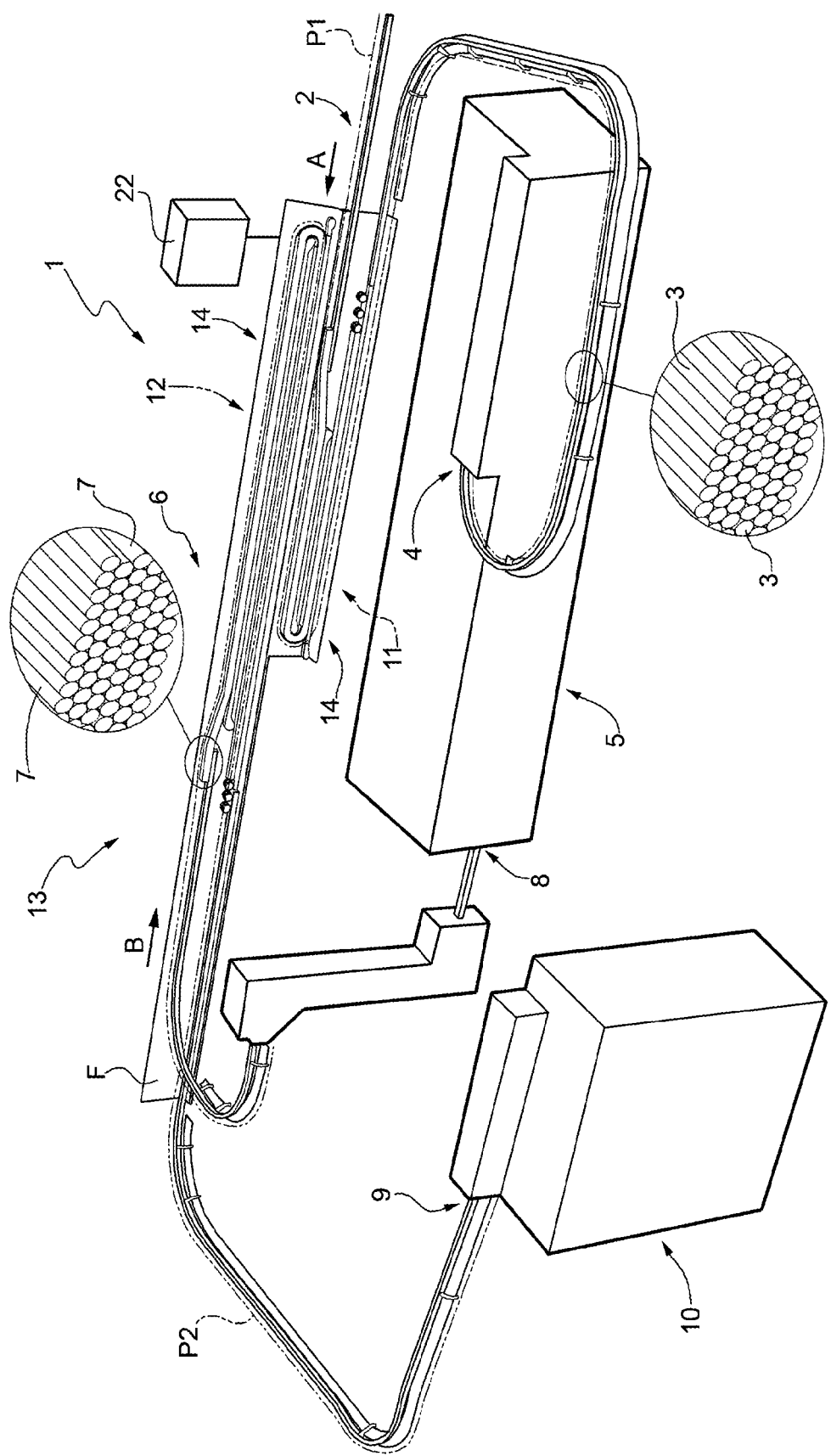
FIG. 1 is a perspective and schematic view of a plant and a transport assembly according to the present invention.

In FIG. 1, 1 denotes as a whole a transport assembly of the smoking products manufacturing industry.

The transport assembly 1 comprises: a conveying system 2 for feeding (in bulk) articles 3 (in particular, substantially cylindrical) of the smoking products manufacturing industry along a conveying path P1 to an input station 4 of a (processing) machine 5; and a conveying system 6 for conveying (in bulk) articles 7 (in particular, substantially cylindrical) of the smoking products manufacturing industry along a conveying path P2 from an output station 8 of the machine 5 (in particular, to an input station 9 of a further—processing—machine 10).

The conveying system 2 is configured to change the length of a (variable length) stretch 11 of the conveying path P1. The conveying system 6 is configured to change the length of a (variable length) stretch 12 of the conveying path P2. The stretches 11 and 12 are arranged (at least partially) facing one another.

With the transport assembly 1 according to the present invention it is possible to reduce the overall dimension of the variable capacity storage systems.

In this regard, it should be noted that the conveying system 2 (more precisely, the stretch 11) and the conveying system 6 (more precisely, the stretch 12) act as variable capacity stores, in particular of the FIFO ("first in, first out") type and that their particular relative positioning allows to make better use of the available space. In fact, the conveying systems 2, 6 are mutually arranged so that the portions 11, 12 face one another (in particular, they at least partially overlap one another and/or are side by side).

It is intended that stretches 11 and 12 are (at least partially) facing (one another), when the longitudinal extension of the stretch 11 is (at least partially) facing the longitudinal extension of the stretch 12.

In particular, the stretches 11 and 12 (at least partially) overlap one another and/or are side by side. In other words, at least part of the longitudinal extension of the stretch 11 and at least part of the longitudinal extension of the stretch 12 (at least partially) overlap one another and/or are side by side.

Advantageously but not necessarily, the stretches 11 and 12 each comprise at least a respective part (more particularly at least two parts) substantially linear. In particular, the substantially linear part of the stretch 11 is substantially parallel to the substantially linear part of the stretch 12. In addition, or alternatively, the substantially linear part of the stretch 11 and the substantially linear part of the stretch 12 (at least partially) overlap one another and/or are side by side.

Typically, the transport assembly 1 is part of a plant 13 of the smoke product manufacturing industry which comprises (in addition to the transport assembly 1) also the machine 5 (and, in particular, the machine 10).

According to some non-limiting embodiments, the articles 3 are pieces of the smoking products to be made. In these cases, the machine 5 can be a machine for assembling said pieces, for example by combining them together and wrapping them in a wrapping sheet, and obtaining the articles 7 (smoking products-cigarettes-multi-components). According to a non-limiting example, the machine 5 can be like the one described in the patent application US2015289559 of the same applicant.

According to alternative embodiments, the machine 5 is configured only to orient part or all of the articles 3 in a different way. In these cases, the articles 3 and 7 are substantially the same.

In some non-limiting cases, the machine 10 is a packing machine, i.e. a machine that receives the articles 7 and packs them so as to obtain packets of articles 7. According to some alternative embodiments, the machine 10 is configured to further treat the articles 7 for example by combining them with further components (for example filters or other components).

According to the illustrated embodiment (FIG. 1), the conveying system 2 (in particular, the stretch 11) and the conveying system 6 (in particular, the stretch 12) are arranged in a higher position relative to (above) the machine 5 (and, in particular, also to the machine 10). Advantageously, the conveying systems 2, 6 do not occupy any space on the ground further than that occupied by the machines 5, 10; in this way, the overall dimension of the system is limited due to the advantage of having conveying systems dedicated to two articles of different types.

It is understood that, according to non-illustrated embodiments, the conveying systems 2, 6 could be arranged on the ground and/or side by side to the machines 5, 10.

Advantageously but not necessarily, and according to the illustrated embodiments, the conveying system 2 and/or the conveying system 6 comprise/s (each) at least one respective conveying assembly 14, which is configured to convey the articles 3 and/or, the articles 7, respectively, along at least a (variable length) portion of the stretch 11 and of the stretch 12, respectively.

Alternatively, according to non-illustrated embodiments, the conveying system 2 can comprise a conveying assembly 14, but the conveying system 6 cannot comprise a conveying assembly having the structure of the conveying assembly 14. Conversely, in some cases, the conveying system 6 can comprise a conveying assembly 14, but the conveying system 2 cannot comprise a conveying assembly having the structure of the conveying assembly 14.

With reference to the Figures, the conveying system 2 and the conveying system 6 each comprise at least one respective conveying assembly 14. In these cases, the conveying assemblies 14 of the conveying systems 2 and 6 can be the same or different (however they are distinct entities).

In addition, the conveying system 2 and/or the conveying system 6 can comprise (each) at least one respective conveying assembly CG and/or 14' (in particular, located downstream of the conveying assembly 14). The conveying assembly 14 is designed to move the articles 3 or the articles 7 (the articles 3 and/or the articles 7, respectively) in a first direction A or B, respectively. The conveying assembly CG and/or 14 is designed to move the articles 3 or the articles 7 (the articles 3 and/or the articles 7, respectively) along a further portion of the stretch 11 and of the stretch 12, respectively, in a second direction B or A, respectively, which is substantially opposite the first direction A or B.

As illustrated in Figures from 1 to 3, according to some embodiments, the conveying systems 2 and 6 comprise a respective conveying assembly 14 and an additional conveying assembly CG (the latter formed by only a linear conveyor). In such a case, the relative conveying paths P1, P2 are "C"-shaped.

Figure 4:
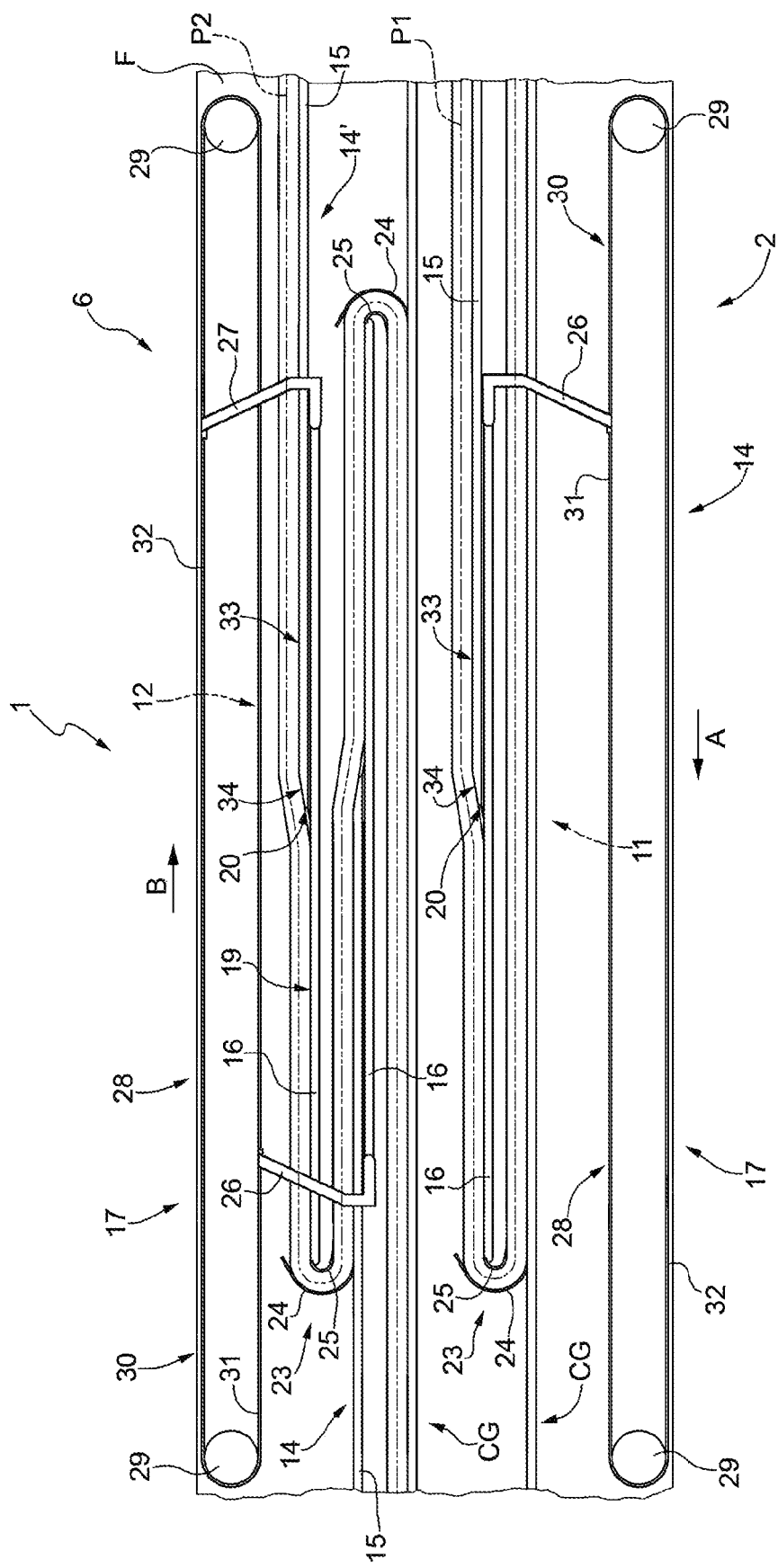
FIG. 4 is a front view of a further embodiment of a part of the transport assembly of FIG. 1.

Alternatively, FIG. 4 illustrates an embodiment, in which the conveying system 2 comprises the conveying assembly 14 and the conveying assembly CG whereas the conveying system 6 comprises the conveying assemblies 14, 14' and the conveying assembly CG. In such a case, the conveying path P1 is "C"-shaped whereas the conveying path P2 is "S"-shaped.

According to the embodiments illustrated in the figures, the conveying assembly 14 of the conveying system 2 moves the articles 3 in the direction A; the conveying assembly CG of the conveying system 2 moves the articles 3 in the direction B; the conveying assembly 14 of the conveying system 6 moves the articles 7 in the direction B; the conveying assembly CG or 14' of the conveying system 6 moves the articles 7 in the direction A.

According to alternative and not illustrated embodiments, both the conveying assemblies 14 of the conveying system 2 and the conveying system 6 move the articles in the direction A; similarly, both the conveying assemblies CG and/or 14' of the conveying system 2 and of the conveying system 6 move the articles in the direction B.

Advantageously but not necessarily, the conveying assemblies 14, CG and/or 14' are arranged one under the other. More precisely, the conveying assembly CG is arranged under the conveying assembly 14 (and also possibly the conveying assembly 14').

In particular, the (each) conveying assembly CG comprises (is formed by) a (single) linear conveyor LC.

In particular, the (each) conveying assembly 14' has a structure (and operation) like that (those) of the conveying assembly 14 (said structure will be described in detail in the following). In general, the (each) conveying assembly 14' comprises a respective conveyor 15 and a respective conveyor 16. Advantageously but not necessarily, the moving assembly 17 (described in more detail in the following) is (at least partially) shared by the (by each) conveying assembly 14 and by the (by each) conveying assembly 14'.

Advantageously but not necessarily, the stretches 11 and 12 (in particular, the conveying assemblies 14 and possibly 14' and/or CG) are arranged (at least partially) so as to extend (at least partially) within the lateral dimensions of the machine 5. In this way, the impact (in terms of occupied space) of the transport assembly 1 is even less.

In the following a description is provided of some non-limiting embodiments of the structure and operation of the conveying system 2 and of the related transport assembly 14. Said description is to be considered applicable mutatis mutandis also to the conveying system 6 and to the relative conveying assembly 14 regardless of the specific structure and operation of the conveying system 2.

According to some non-limiting embodiments, the (each) conveying assembly 14 comprises: a conveyor 15 (linear), at least one conveyor 16 (linear) and at least one moving assembly 17 to move at least one between the conveyor 15 and the conveyor 16 relative to one another between a first conformation (for example illustrated in FIG. 3), wherein the conveyor 15 and the conveyor 16 at least partially overlap one another, and a second conformation (for example illustrated in FIG. 2), wherein the conveyor 16 has an active portion 18, which is offset from the conveyor 15, passing through at least one intermediate conformation (for example illustrated in FIG. 5), wherein the conveyor 15 and the conveyor 16 partially overlap one another and the conveyor 16 has an active portion 19, which is offset from to the conveyor 15 and is shorter than the active portion 18.

In particular, the conveyor 15 has an end 20 arranged along the aforementioned portion (with variable length—of the stretch 11 of the path P1). The active portion 18 and the active portion 19 extend from the end 20 beyond the conveyor 15 (in particular, along the stretch 11; more precisely, along the respective variable-length portion).

In the first conformation (that is, when the conveyors 15 and 16 are in the first conformation), the aforementioned portion (with variable length—of the stretch 11) has a first length; in the second conformation (that is, when the conveyors 15 and are in the second conformation), the (variable length) portion extends along at least the (part of the) conveyor 15 and the (at least part of the) active portion 18 and has a second length, which is greater than the first length; in the intermediate conformation (that is, when the conveyors 15 and are in the intermediate conformation), the portion (with variable length—of the stretch 11) extends along the (at least part of the) conveyor 15 and the (at least part of the) active portion 19 and has a third length, which is greater than the first length and smaller than the second length.

In particular, in use, the conveyor 15 moves the articles 3 along a first part of the aforementioned portion (with variable length—of the stretch 11 of the path P1) until the end 20. At this point, the articles 3 are transferred to the conveyor 16 (more precisely, the active portion 18 or 19 of the conveyor 16), which moves the articles 2 along a second part of the aforementioned (variable length) portion and, advantageously but not necessarily, transfers them, in turn, downstream, in particular to a second conveying assembly CG or to a further conveying assembly 14' (equal to or different from the conveying assembly 14) of the conveying system 2.

It should be noted that even while the articles 3 are moved along the (variable length) portion of the stretch 11 (of the path P1), the moving assembly 17 can move (more precisely, translate) the conveyors 15 and 16 one relative to the other (more precisely, the conveyor 16 relative to the conveyor 15). In this way, the length of the active portion of the conveyor 16 and therefore of the (variable length) portion of the stretch 11 (thus modifying the storage capacity defined by the conveying system 2) can be varied even while the articles 3 are moved along the (variable length) portion of the stretch 11.

According to some non-limiting embodiments (as shown for example in the attached Figures), also in the first conformation (FIG. 3) the conveyor 16 has an active portion 21 offset from the conveyor 15 (more precisely, which extends from the end 20 beyond the conveyor 15, in particular along the stretch 11). In addition, or alternatively, also in the second conformation (FIG. 2) the conveyor 15 and the conveyor 16 partially overlap one another.

It should be noted that the conveying system 2 has a decidedly reduced overall dimensions (in particular, front and vertical).

Advantageously but not necessarily, the (each) conveyor 15 is mounted in a substantially fixed manner (for example, on a frame F) and the moving assembly 17 is configured to move the (each) conveyor 16 relative to the respective conveyor 15.

In this way, it is possible to maintain the lateral dimensions of the conveying system 2 contained. In this regard, it should be noted that when both the conveyors 15 and 16 are mobile, to obtain the same maximum capacity as the conveying system 2 it is necessary to increase the width of the store 1 itself (so as to give sufficient movement space to the conveyors 15).

According to some non-limiting embodiments, the (each) conveyor 15 is arranged above the respective conveyor 16. This allows to obtain a simpler and more efficient operation of the conveying system 2.

The conveying system 2 is configured to convey the articles 3 from a first end of the stretch 11 to a second end of the stretch 11, which second end is arranged in a lower position than the first end. In other words, the conveying system 2 is designed to convey the articles 3 along the (at least part of the) stretch 11 from top to bottom. In this way, it facilitates (among other things) the passage of the articles 3 from the conveyor 15 to the conveyor 16 (by using gravity) and/or between successive conveying assemblies 14 and/or CG and/or 14'.

According to some non-limiting embodiments, the transport assembly 1 (more precisely, the conveying system 2) also comprises at least one control unit 22 (schematically illustrated) designed to (configured to) regulate the speed of (of each) conveyor 15, of (of each) conveyor 16 and of (of each) moving assembly 17 in a coordinated manner so as to maintain the height of the mass of articles 3 substantially constant (in particular, along the path P1; more particularly, along the stretch 11).

More precisely, the (each) conveyor 15 and the (each) conveyor 16 comprise at least one respective drive motor (of a type known per se and not illustrated) separate from the other drive motors; the (each) moving assembly 17 is provided with at least one movement motor (per se known and not illustrated) separate from the drive motors. Even more precisely, the control unit 22 is designed to regulate the speed of each drive motor and of the movement motor in a coordinated manner so as to maintain the height of the mass of articles 15 substantially constant (both over time and along the stretch 11).

In particular, the control unit 22 is designed to (configured to) regulate the operation of the conveyors 15 and 16 (more precisely, of their drive motors) and of the moving assembly 17 (in particular, of its movement motor) so as to vary the (containment) capacity of the conveying system 2 (and the quantity of articles 3 moved through the ends of the stretch 11) according to the needs of the machine 5 arranged downstream of the conveying system 2 (and possibly the output of an additional machine or device—e.g. a hopper—arranged upstream of the conveying system 2). For example, when the output of the machine and/or device arranged upstream of the conveying system 2 is greater than the needs of the machine 5 arranged downstream of the conveying system 2, the control unit 22 can adjust the speeds of the conveyors 15 and 16 consequently (so as to have a higher speed at the first end of the stretch 11 and a lower speed at the second end—closer to the machine 5—of the stretch 11) and actuate the moving assembly 17 so as to increase the (containment) capacity of the conveying system 2 (by lengthening the active portion of at least one conveyor 16; more precisely, by lengthening the active portion of each conveyor 16).

Figure 2:
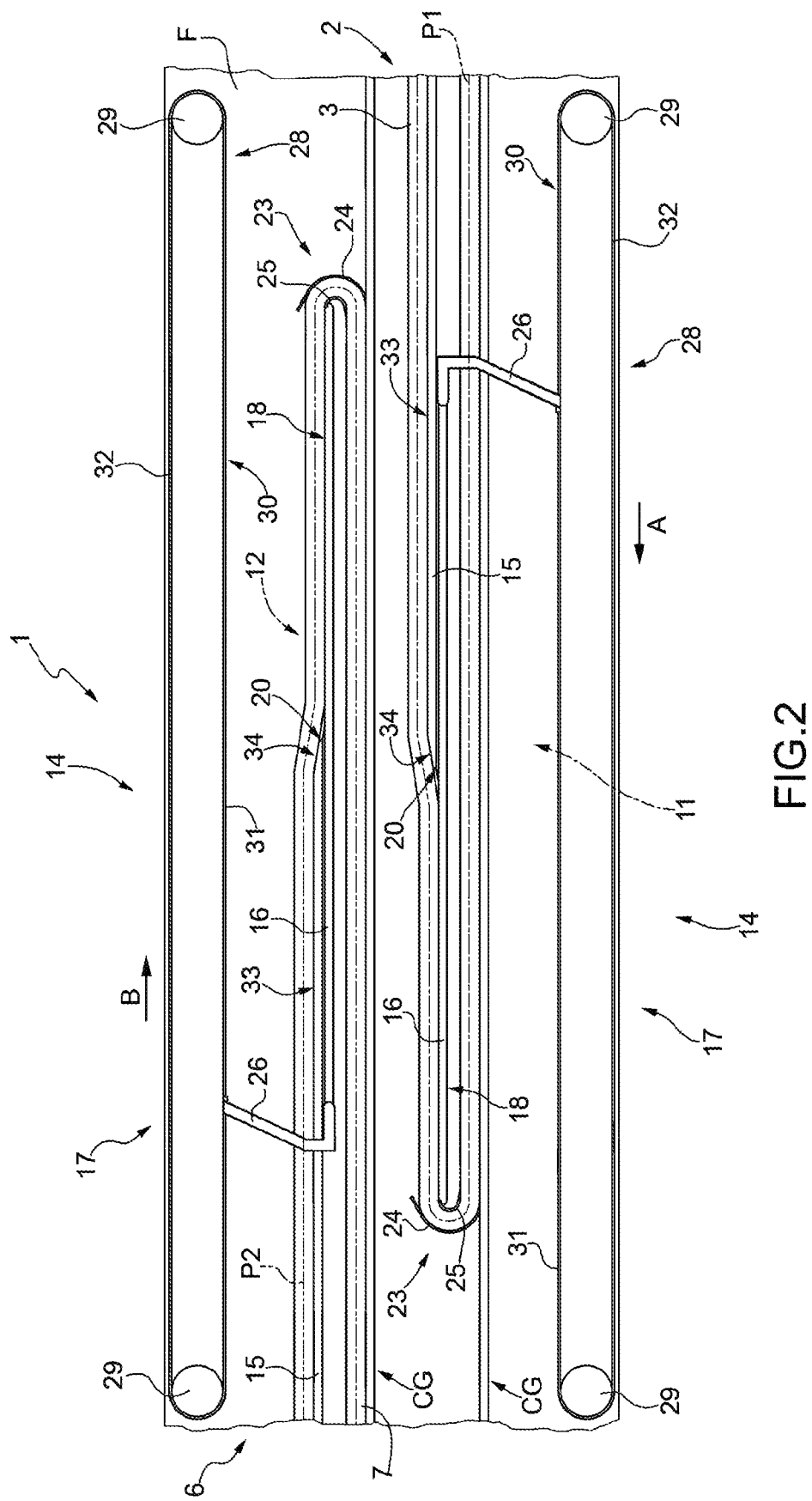
FIG. 2 is a front view of a part of the transport assembly of FIG. 1.
Figure 3:
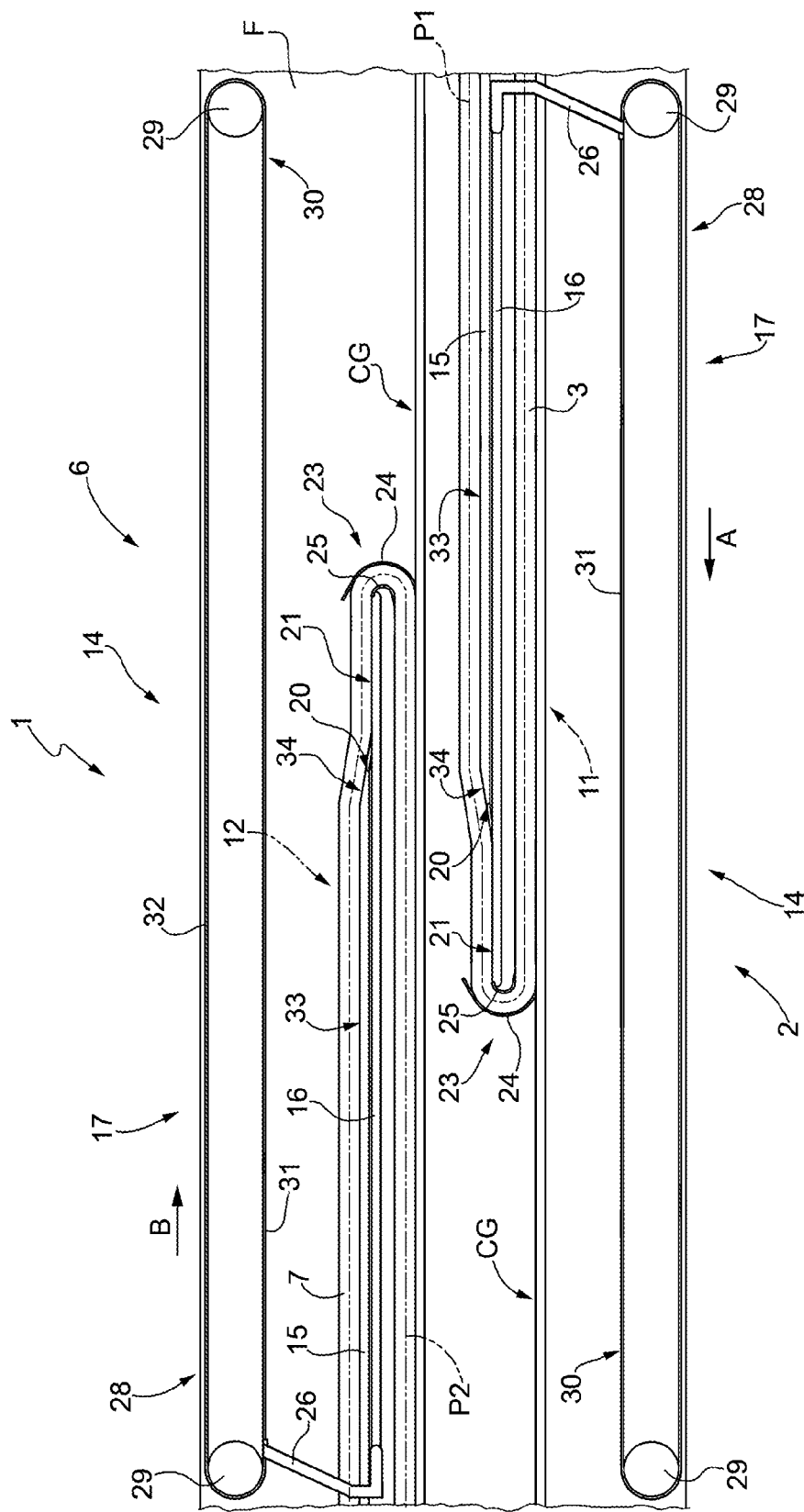
FIG. 3 is a front view of the part of the transport assembly of FIG. 2 in a different operating conformation.
Figure 5:
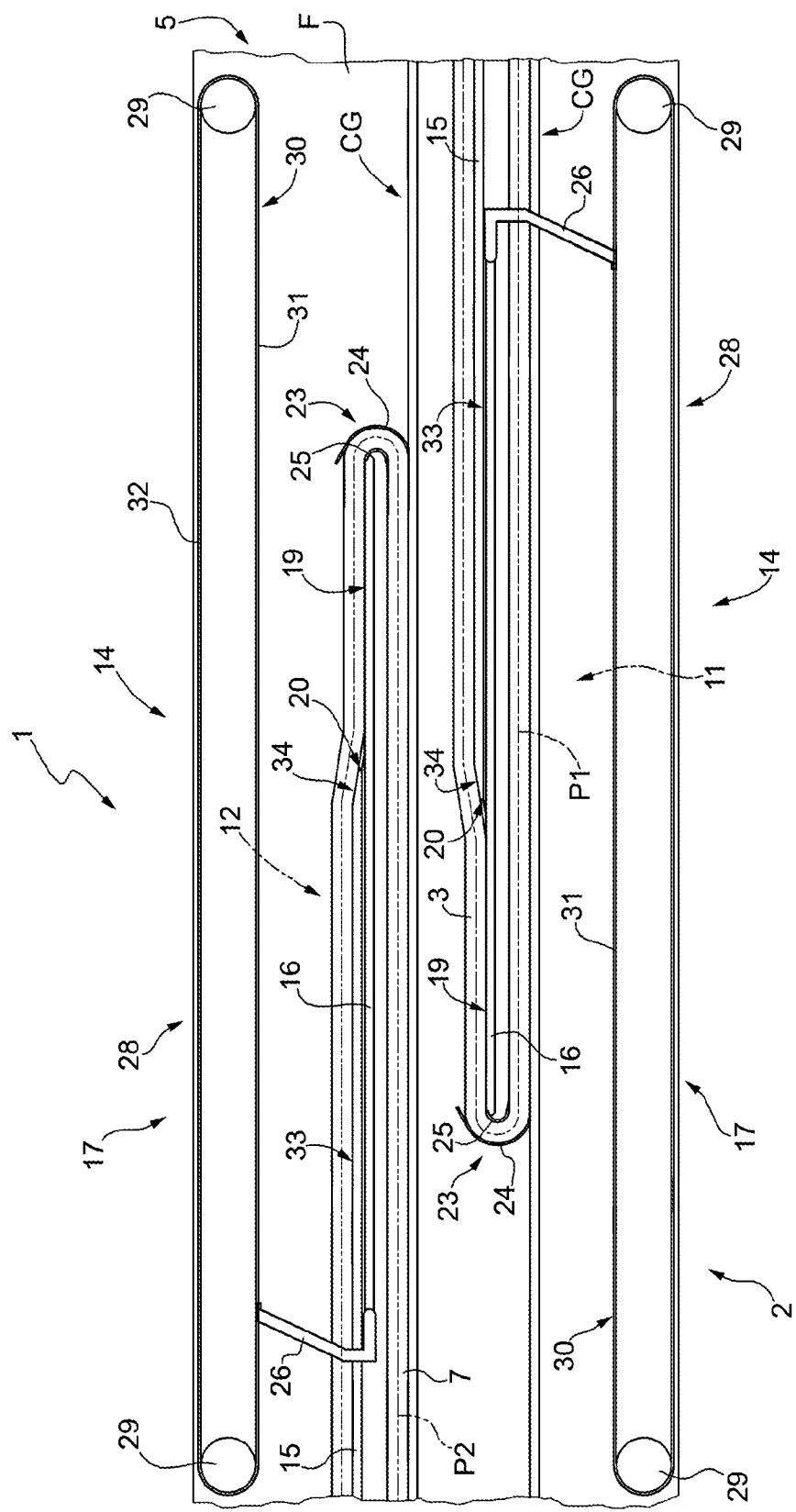
FIG. 5 is a front view of the part of the transport assembly of FIGS. 2 and 3 in a different operating conformation.

According to some non-limiting embodiments, the moving assembly 17 is designed to move each conveyor 16 independently of the other conveyors 16 (of the conveying system 2). In these cases, the moving assembly 17 comprises a plurality of movement motors each of which is designed to translate a respective conveyor 16. Advantageously but not necessarily (as illustrated in FIGS. 2, 3 and 5), the moving assembly 17 moves a plurality of (all the) conveyors 16 (of the conveying system 2) together. In these cases, in particular, the moving assembly 17 has a single movement motor.

According to some non-limiting embodiments, the conveyor 15 is designed to move the articles 3 at a first speed V1; the moving assembly 17 is designed to move the conveyor 16 at a second speed V2; and the conveyor 16 is designed to move the articles 3 at a third speed V3. The control unit 22 is designed to (configured to) control the operation of the conveyor 15 so as to adjust the third speed V3 as a function of the difference between the first speed V1 and the second speed V2, in particular so that the third speed V3 is substantially equal to the difference between the first speed V1 and the second speed V2 (V3=V1−V2).

Note that in the present text, with difference and/or sum speed is meant a difference and/or a vector sum of speeds (in other words, speeds are considered vectors and their positioning-direction and orientation—becomes relevant).

Advantageously but not necessarily, the (each) conveyor 15 (of a first conveying assembly 14 or of a first series of conveying assemblies 14 and 14') is a substantially linear conveyor and is designed to move the articles 15 in the direction A; the (each) conveyor 16 (of a first conveying assembly 6 or of a first series of conveying assemblies 6) is a substantially linear conveyor designed to move the articles 15 in the direction A.

The active portion (18, 19 and/or 21) of the conveyor 16 extends from the end 20 in the direction A. In particular, the moving assembly 17 is configured to move (translate) the (each) conveyor 16 in the direction A; more specifically, the moving assembly 17 is also configured to move (translate) the conveyor 16 in a direction B (equal and) opposite to the direction A. In other words, the moving assembly 17 is also configured to move (translate) forward and backward the conveyor 16 in the direction A.

Advantageously but not necessarily, the (each) conveyor 15 of the first conveying assembly 14 (or of a first series of conveying assemblies 14 and 14') is arranged offset (and, in particular, fixed) from the conveyor 15 (which is also fixed mounted) of the further conveying assembly 14' (or of a second series of conveying assemblies 14').

According to some non-limiting embodiments, the conveyor 15 of the conveying assembly 14 is designed to move the articles 3 at a first speed V1; the moving assembly 17 is designed to move the conveyor 16 of the conveying assembly 14 at a second speed V2; the conveyor 16 of the conveying assembly 14 is designed to move the articles 3 at a third speed V3; the conveyor 15 of the conveying assembly 14' is designed to move the articles 3 at a fourth speed V4; the moving assembly 17 is designed to move the conveyor 16 of the conveying assembly 14' at a fifth speed V5; the conveyor 16 of the conveying assembly 14' is designed to move the articles at a sixth speed V6.

Advantageously but not necessarily, the control unit 22 is designed to (configured to) control the operation of the conveying assemblies 14 and 14'. The second and fifth speeds V2 and V5 are substantially equal in absolute value ($|V2|=|V5|$). In particular, the second and fifth speeds V2 and V5 are opposite to one another.

Advantageously but not necessarily, the control unit 22 is designed to (configured to) control the operation of the conveyor 15 of the conveying assembly 14' so as to adjust the fourth speed V4 as a function of the sum of the third speed V3 and two times the second speed V2. In particular, the absolute value of the fourth speed V4 is substantially equal to the absolute value of the sum of the speed V3 and twice the second speed ($|V4|=|V3\pm2\times V2|$). More specifically, the third speed V3 is opposite to the fourth speed V4.

According to some non-limiting embodiments, the conveying system 3 comprises at least one guide device 23 (in the embodiment of FIG. 4, the guide devices 23 are two), each of which is designed to allow the passage of the articles 3 between two successive conveying assemblies 14, 14' and/or CG (each guide device 23 is arranged between two successive conveying assemblies) and deflects the articles 3 so as to define a bend of the stretch 11 (of the path P1). In particular, each guide device 23 comprises a curved guide 24 (more precisely, rigid) externally delimiting the aforementioned bend and, more particularly, a curved guide 25 (more precisely, rigid) internally delimiting said bend. Even more particularly, the bend of the path is of approximately 180°.

According to some non-limiting embodiments, the curved guide 24 comprises a first stretch (arranged in the area of the entrance of the aforementioned bend) designed to correct the speed of the articles 3 so that no voids are formed within the mass of articles 3. In particular, the aforementioned first stretch of the curved guide 24 is provided with a vane designed (shaped so as to push the articles 3 in order to) to fill any voids (or holes) of the mass of articles 3 (and therefore compact the mass itself).

Advantageously but not necessarily, a system for adjusting the conveying speeds (upstream and/or downstream of the aforementioned bend) is also provided, so as to guarantee a homogeneous conveying flow (i.e. a homogeneous mass of articles 3).

Advantageously but not necessarily, each guide device 23 is integral with a respective conveyor 16 and, in particular, is arranged in the area of one end of said respective conveyor 16.

According to some non-limiting embodiments, the (each) moving assembly 17 comprises a rigid element 26, in particular a bar, to which at least one conveyor 16 of the conveying assembly 14 is connected in an integral manner (in some cases, a plurality of conveyors 16).

In some non-limiting cases (as illustrated for example in FIG. 4, regarding the conveying system 6), the moving assembly 17 also comprises at least one rigid element 27, in particular a bar, to which at least one further conveyor 16 of the conveying assembly 14' (in some cases, a plurality of further conveyors 16) is connected; and an actuator for moving the rigid elements 26 and 27, in particular in the direction A and, respectively, in the direction B and vice versa, in particular so as to lengthen and/or shorten (simultaneously) the active portion of the conveyor 16 of the conveying assembly 14 and/or of the further conveyor 16 of the conveying assembly 14'.

More precisely, the moving assembly 17 (in particular, the aforementioned actuator) comprises a conveyor 28 (in particular, linear) having at least two pulleys 29 and a belt element 30 partially wrapped around the two pulleys 29 so as to have a first and a second branch 31 and 32 arranged on opposite sides of the pulleys 29. The rigid element 26 is connected to the branch 31. In particular, the possible rigid element 27 is connected to the branch 32. At least one of the pulleys 29 is connected to a movement motor designed to create a rotation motion to said pulley 29.

In particular, the belt element 30 comprises (is) a belt, a belt-like element and/or a chain (and/or a similar element).

According to some non-limiting embodiments, the conveyors 15 and are belt conveyors and, in particular, each comprise a respective belt, a respective belt-like element and/or a respective chain (and/or a similar element).

Advantageously but not necessarily, the conveyor 15 has a conveying portion 33 and an unloading portion 34 arranged between the conveying portion 33 and the end 20. The stretch 11 extends along the conveying portion 33, along the unloading portion 34 and beyond the end 20; the unloading portion 34 has an inclination ranging from 3° to 23° relative to the conveying portion 33.

According to some embodiments, the end 20 has a thickness ranging from 5 to 23 mm. In particular, the conveying portion 33 has a thickness ranging from 98 to 108 mm.

As already indicated, the above description of the structure and functioning of the conveying system 2 and of the relative conveying assembly 14 is to be considered applicable mutatis mutandis also to the conveying system 6 and to the relative conveying assembly 14 regardless of the. specific structure and functioning of the conveying system 2. In this context, for example, where there is a reference to the articles 3, the articles 7 must be considered, and where there is a reference to the stretch 11 (of path P1), the stretch 12 (of path P2) must be considered.

By specifying that what described is also applicable to the conveying system 6 and to the relative conveying assembly 14 independently from the specific structure and operation of the conveying system 2, it is understood that the conveying system 6 can present a part of (or all) the characteristics, among those described, different from the characteristics of the conveying system 2.

In any case, according to some advantageous embodiments, the conveying system 2 and the conveying system 6 have the same characteristics (among those described above); in other words, they are defined in the same way.

In accordance with the preferred embodiment, the control unit 22 is designed (configured to) control both the conveying system 2 and the conveying system 6. In particular, the control unit 22 is configured to change the length of the stretches 11, 12 of the respective conveying paths P1, P2.

Advantageously but not necessarily, the control unit 22 is designed (configured to) control the conveying systems 2 and 6 (more precisely, the respective conveying assemblies 14, 14' and/or CG; still more precisely, the respective moving assemblies 17 and conveyors 15 and 16) independently of one another. In this way, for example, it is possible to increase the length of the stretch 11 (more precisely of its variable-length portion—thus increasing the storage capacity of the conveying system 2) and simultaneously reduce the length of the stretch 12 (more precisely of its variable length portion—thus reducing the storage capacity of the conveying system 6) and vice versa.

According to some non-limiting embodiments, the store 1 also comprises the frame F (on which the conveying system 2, more precisely its conveying assemblies 14 and CG, and the conveying system 6, more precisely its conveying assemblies 14 and CG, are mounted). Advantageously but not necessarily, the frame F comprises supports (in particular, legs—known and not illustrated) to maintain the conveying system 2 (and the conveying system 6) at a given distance from the ground. In this way (also thanks to the compactness of the conveying system 2 and of the conveying system 6), it is possible to have an output end of the stretch 11 lifted from the ground to a desired height compatible with the input station 4 of the machine 5 arranged downstream of the conveying system 2. Furthermore, in this way, it is possible to maintain the conveying systems 2 and 6 at a height that does not prevent the use of the space below (for example, in order to allow easy passage of the operators).

With particular reference to Figures from 6 to 11, as an alternative or in addition to what is described above, according to some embodiments, a plant 35 of the smoking article manufacturing industry which comprises a (processing) machine 5 is described in the following, which is substantially identical to the plant 13 and differs from it exclusively in that only one between the conveying system 2 and the conveying system 6 has at least one stretch arranged in higher position relative to (in particular, above) the machine 5.

More precisely, the plant 35 comprises a machine 5 (of the processing type; in particular, as defined above in relation to FIGS. 1-5); the conveying system 2 for feeding (in bulk) articles 3 (in particular, substantially cylindrical) of the smoking products manufacturing industry along the conveying path P1 to an input station 4 of the (processing) machine 5; and the conveying system 6 for conveying (in bulk) articles 7 (in particular, substantially cylindrical) of the smoking products manufacturing industry along the conveying path P2 from (downstream) an output station 8 of the machine 5 (in particular, at an input station 9 of a further processing machine 10—which is part of the plant 35—e.g. as defined above).

Optionally, the plant 35 comprises, furthermore, the machine 10.

In particular, the articles 3 and 7 are, as defined above referring to what is described with reference to FIGS. 1-5.

According to some non-limiting embodiments, the articles 3 are pieces of the smoking products to be made. In these cases, the machine 5 can be a machine for assembling said pieces, for example by combining them together and wrapping them in a wrapping sheet, and obtaining the articles 7 (smoking products-cigarettes-multi-components). According to a non-limiting example, the machine 5 can be like the one described in patent application US2015289559 of the same applicant.

Alternatively, according to some non-illustrated embodiments, the articles 7 are packets (of articles 3 which, in particular, are smoking articles; more particularly, in these cases, the articles 3 are cigarettes). In these cases, for example the machine 10 is a cellophane wrapper (and the machine 5 is a packing machine).

Advantageously but not necessarily, only one between the conveying system 2 and the conveying system 6 is configured to change the length of the (variable length) stretch 11 of the path P1 or of the (variable length) stretch 12 of the path P2, respectively.

Figure 6:
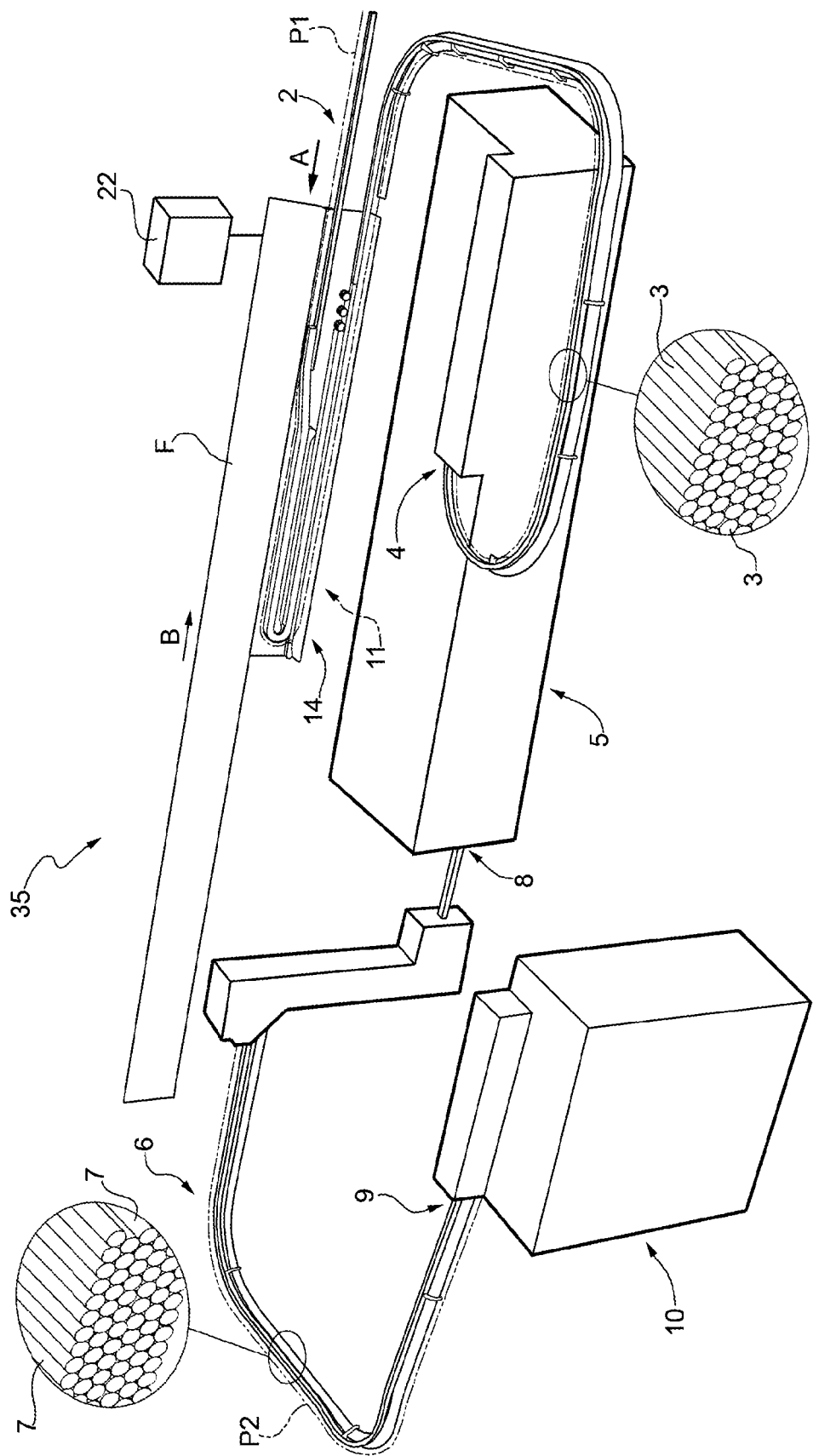
FIG. 6 schematically illustrates and in perspective an alternative embodiment of the system of FIG. 1.
Figure 7:
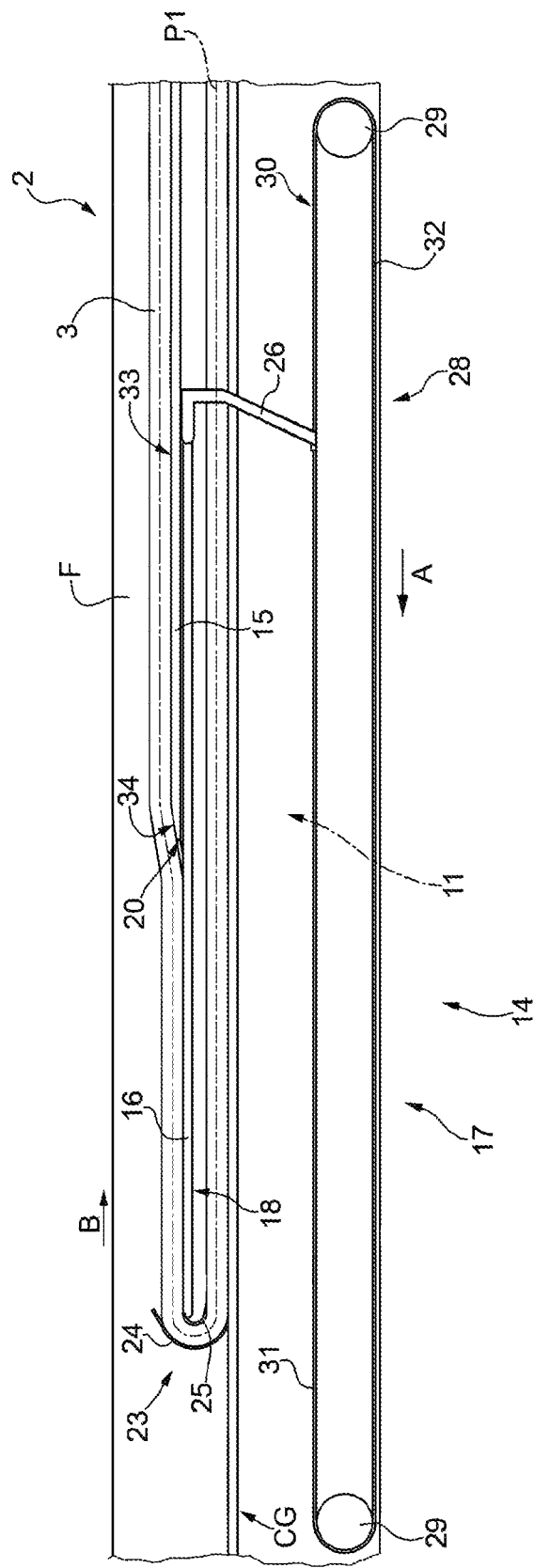
FIG. 7 is a front view of a part of the transport assembly of FIG. 6.
Figure 8:
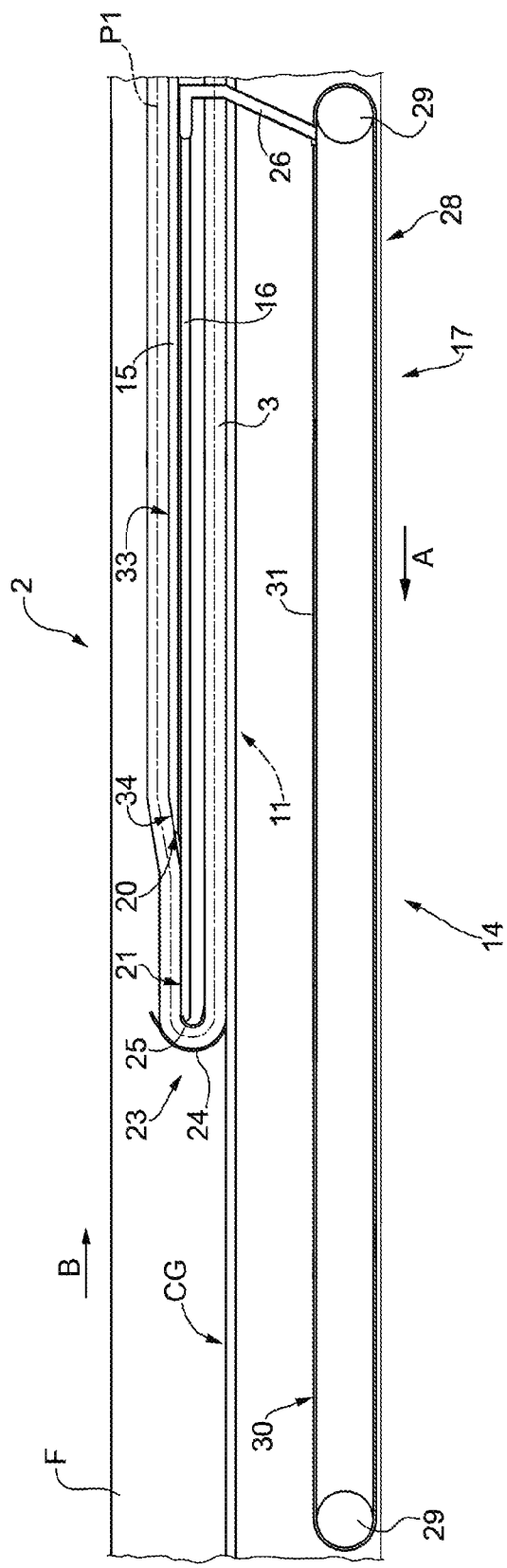
FIG. 8 is a front view of the part of the transport assembly of FIG. 6 in a different operating conformation.
Figure 9:
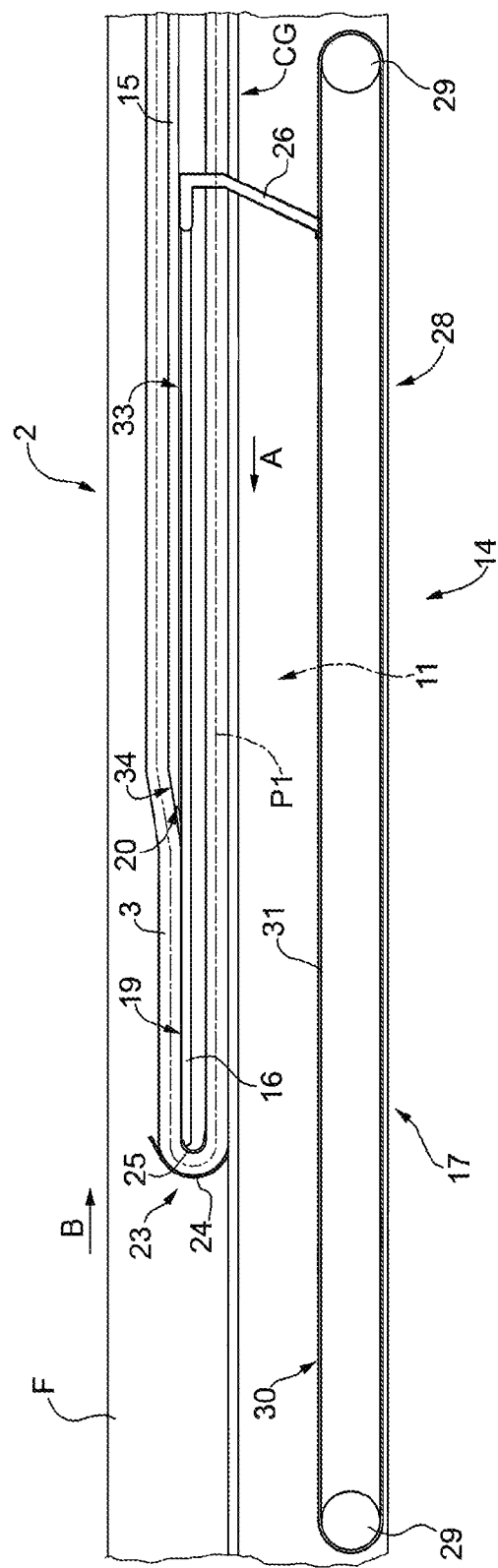
FIG. 9 is a front view of a further embodiment of a part of the transport assembly of FIG. 6.

According to some non-limiting embodiments (as illustrated in FIG. 6), the conveying system 2 is configured to change the length of the stretch 11 of the conveying path P1. On the contrary, the length of the conveying path P2 (in particular, of the conveying system 6) is substantially fixed.

Advantageously, at least the stretch 11 of the path P1 is arranged in a higher position relative to (i.e. at a higher height relative to) the machine 5 (and, in particular, also to the machine 10). In particular, the conveying system 2 does not occupy any space on the ground beyond that occupied by the machine 5 (and possibly by the machine 10). In this way, the overall dimension of the system is limited in view of the advantage of having a conveying system 2 that can also perform a storage function (buffer).

According to preferred but not limiting embodiments, at least the stretch 11 (in particular, the conveying system 2) of the path P1 is arranged above (over) the machine 5. In this way, the overall dimensions are further reduced.

Advantageously but not necessarily, the conveying system 2 is as described above (in particular, in relation to the embodiments of FIGS. 1-5).

More precisely but not necessarily, the conveying system 2 comprises at least one respective conveying assembly 14, which is configured to convey the articles 3 along at least a (variable length) portion of the stretch 11.

According to some non-limiting embodiments, the conveying system 2 comprises at least one respective conveying assembly CG and/or 14' (in particular, arranged downstream of the conveying assembly 14). The conveying assembly 14 is designed to move the articles 3 in a first direction A. The conveying assembly CG and/or 14' is designed to move the articles 3 along a further portion of the stretch 11 in a second direction B, which is substantially opposite the first direction A or B.

In Figures from 6 to 9, embodiments are illustrated in which the conveying system 2 comprises a conveying assembly 14 and a further conveying assembly CG (the latter formed by only one linear conveyor). In this case, the relative conveying path P1 is "C"-shaped.

Figure 10:
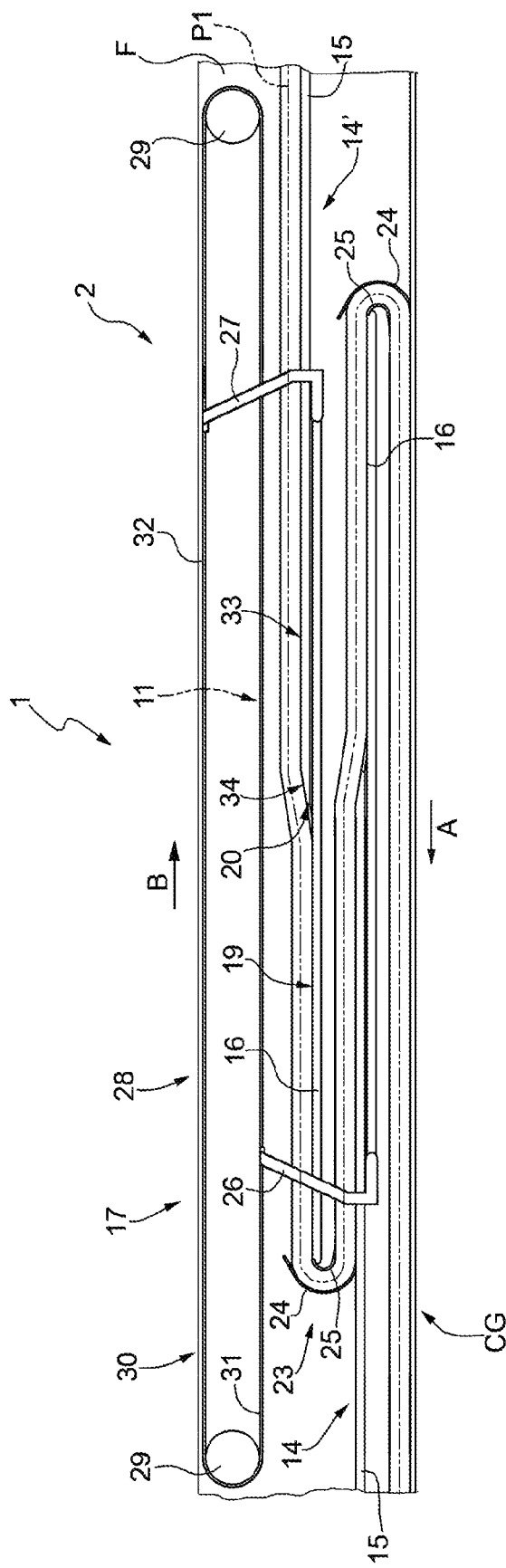
FIG. 10 is a front view of the part of the transport assembly of FIGS. 7 and 8 in a different operating conformation.

In FIG. 10, an embodiment is illustrated in which the conveying system 2 comprises the conveying assemblies 14, 14' and the conveying assembly CG. In this case, the conveying path P1 is "S"-shaped.

In accordance with the embodiments illustrated in Figures from 6 to 9, the conveying assembly 14 moves the articles 3 in the direction A; the conveying assembly 14' moves articles 3 in direction B; the conveying assembly CG moves articles 3 in direction A.

In particular, the (each) conveying assembly CG comprises (is formed by) a (single) linear conveyor LC.

In particular, the (each) conveying assembly 14' has a structure (and an operation) like that (those) of the conveying assembly 14. In general, the (each) conveying assembly 14' comprises a respective conveyor 15 and a respective conveyor 16. Advantageously but not necessarily, the moving assembly 17 (described in the following in more detail) is (at least partially) shared by the (by each) conveying assembly 14 and by the (by each) conveying assembly 14'.

Advantageously but not necessarily, the stretch 11 (in particular, the conveying assemblies 14 and possibly 14' and/or CG) are arranged (at least partially) so as to extend (at least partially) within the lateral dimensions of the machine 5 In this way, the impact (in terms of space occupied) of the transport assembly 1 is even smaller.

Advantageously but not necessarily, the structure and operation of the conveying assembly 14 are as described above (in particular, in relation to FIGS. 1-5).

More precisely, the conveyor 15 and/or the conveyor 16 and/or the moving assembly 17 and/or the active portion 18 and/or the active portion 19 and/or the end 20 and/or the active portion 21 and/o the control unit 22 and/or the guide device 23 and/or the curved guide 24 and/or the curved guide 25 and/or the rigid element 26 and/or the rigid element 27 and/or the conveyor 28 and/or the pulleys 29 and/or the belt element 30 and/or the branch 31 and/or the branch 32 and/or the conveying portion 33 and/or the unloading portion 34 have a structure and an operation as described above (in relation to FIGS. 1-5).

According to some non-limiting embodiments, the store 1 also comprises the frame F (on which the conveying system 2 is mounted; more precisely, its conveying assemblies 14, CG and possibly 14'). Advantageously but not necessarily, the frame F comprises supports (in particular, legs—known and not illustrated) to maintain the conveying system 2 at a given distance from the ground. In this way (also thanks to the compactness of the conveying system 2), it is possible to have an output end of the stretch 11 lifted from the ground to a desired height compatible with the input station 4 of the machine 5 arranged downstream of the conveying system 2. Furthermore, in this way, it is possible to maintain the conveying system 2 at a height such as not to prevent the use of the space below (for example, so as to allow easy passage of the operators).

Figure 11:
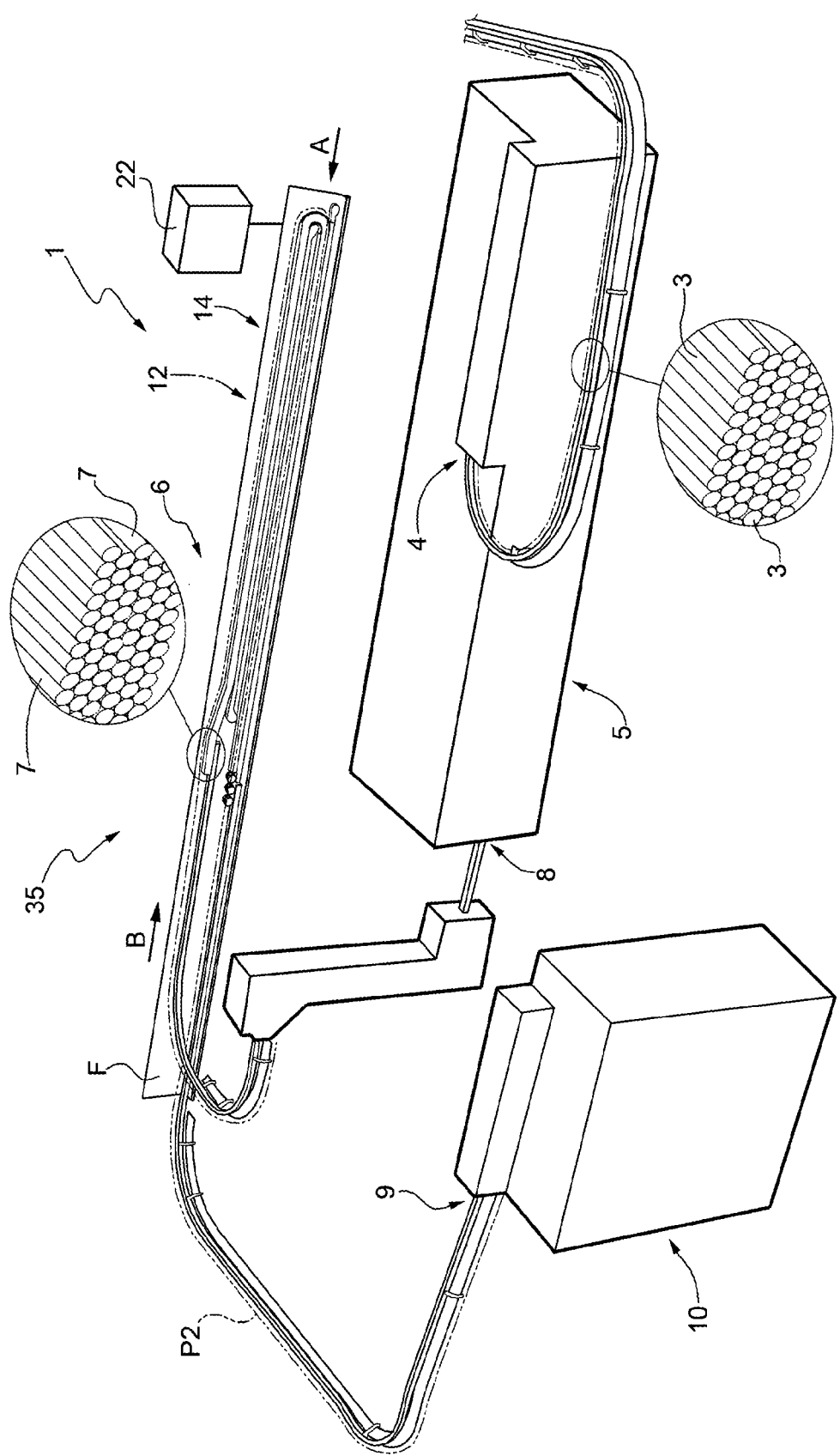
FIG. 11 schematically illustrates and in perspective an alternative embodiment of the plant of FIG. 1.

According to some non-limiting embodiments (as illustrated in FIG. 11), the conveying system 6 is arranged in higher position relative to (i.e. at a higher height relative to) the machine 5 (and, in particular, also to the machine 10).

More precisely, in these cases, at least the stretch 12 of the path P2 is arranged in higher position relative to (i.e. at a higher height relative to) the machine 5 (and, in particular, also to the machine 10). More specifically, the conveying system 6 does not occupy any space on the ground further than that occupied by the machine 5 (and possibly by the machine 10). In this way, the overall dimension of the system is limited in view of the advantage of having a conveying system 6 capable of also performing a storage function (buffer).

According to preferred but not limiting embodiments, at least the stretch 12 of the path P2 (in particular, the conveying system 6) is arranged above (over) the machine 5. In this way, the overall dimensions are further reduced.

Alternatively (according to embodiments not illustrated), at least the stretch 12 of the path P2 (in particular, the conveying system 6) is arranged above (over) the machine 10.

Advantageously but not necessarily (also in this case with particular reference to FIG. 11), the conveying system 6 is configured to change the length of a (variable length) stretch 12 of the conveying path P2. On the contrary, the length of the conveying path P1 (in particular of the conveying system 2) is substantially fixed.

In these cases, what above described and illustrated (FIGS. 6-10) with regard to the conveying system 2, is valid for (applicable to) the conveying system 6.

According to some alternatives not illustrated, the transport assembly 1 is substantially identical to the transport assembly described above with reference to FIG. 1 with the only difference that it comprises (only) the conveying system 2 and is devoid of the conveying system 6 In these cases, in particular, an operator can manually remove the articles 7 from the output station 8.

In accordance with some different alternatives, the transport assembly 1 is substantially identical to the transport assembly described above with reference to FIG. 1 with the only difference that it comprises (only) the conveying system 6 and is devoid of the conveying system 2. In these cases, in particular, an operator can manually bring the articles 3 to the input station 4.

Unless the contrary is explicitly stated, the content of the references (articles, books, patent applications, etc.) mentioned in this text is fully referred hereto.

With particular and not limiting reference to what is illustrated in FIGS. 1-11 and what is described above in relation to them, the following aspects are provided by the present invention.

1.— A plant of the smoking products manufacturing industry; the plant (13; 35) comprises:

a first machine (5), which is configured to treat first articles (3) of the smoking products manufacturing industry and to obtain second articles (7) of the smoking products manufacturing industry; and a transport assembly (1), which, in turn, comprises a first conveying system (2) for feeding said first articles (3) of the smoking products manufacturing industry along a first conveying path (P1) to a first input station (4) of the first machine (5) and/or a second conveying system (6) for conveying said second articles (7) of the smoking products manufacturing industry along a second conveying path (P2) from a first output station (8) of the first machine (5) (in particular, to a second input station (9) of a second machine (10));

the transport assembly (1) is characterized in that:

at least one between the first conveying system (2) and/or the second conveying system (6) is configured to change the length of a variable length stretch (11; 12) of the first conveying path (P1) and/or of the second conveying path (P2), respectively;

said variable length stretch (11; 12) of the first conveying path (P1) and/or of the second conveying path (P2) being arranged in higher position relative to the first machine (5).

2.— The plant according to aspect 1, wherein said variable length stretch (11; 12) of the first conveying path (P1) and/or the second conveying path (P2) is arranged above (over) said first machine (5).

3.— The plant according to aspect 1 or 2, wherein only one between the first conveying system (2) and the second conveying system (6) is configured to change the length of said variable length stretch (11; 12) of the first path (P1) or of the second path (P2), respectively;

said variable length stretch (11; 12) of the first conveying path (P1) or of the second conveying path (P2) being arranged in higher position relative to the machine (5).

4.— The plant according to aspect 3, wherein said variable length stretch (11; 12) of the first conveying path (P1) or of the second conveying path (P2) is arranged above (over) said first machine (5).

5.— The plant according to any one of the preceding aspects, wherein said first conveying system (2) is configured to change the length of the variable length stretch (11) of the first path (P1).

6.— The plant according to any one of the preceding aspects, and comprising a control unit (22) configured to control the first conveying system (2) and/or the second conveying system (6), in particular so as to vary the length of the variable length stretch (11; 12) of the first conveying path (P1) and/or of the second conveying path (P2).

7.— The plant according to any one of the preceding aspects, wherein at least one between the first conveying system (2) and the second conveying system (6) comprises at least a first conveying assembly (14), which is configured to convey said first articles (3) or said second articles (7), along at least a first portion of said variable length stretch (11; 12); wherein the first conveying assembly (14) comprises a first conveyor (15), a second conveyor (16) and at least one moving assembly (17) to move at least one between the first conveyor (15) and the second conveyor (16) relative to one another between a first conformation, in which the first conveyor (15) and the second conveyor (16) at least partially overlap one another, and a second conformation, in which the second conveyor (16) has a first active portion (18), which is offset from said first conveyor (15), passing through at least one intermediate conformation, in which said first conveyor (15) and said second conveyor (16) at least partially overlap one another and said second conveyor (16) has a second active portion (19), which is offset from said first conveyor (15) and is shorter than said first active portion (18); the first conveying assembly (14) is (at least partially) arranged in higher position relative to (above) said first machine (5).

8.— The plant according to aspect 7, wherein only one between the first conveying system (2) and the second conveying system (6) (in particular, only the first conveying system) comprises at least the first conveying assembly (14).

9.— The plant according to aspect 7 or 8, wherein in the first conformation, said first portion has a first length; in the second conformation, said first portion extends along at least part of the first conveyor (15) and at least part of the first active portion (18) and has a second length, which is greater than the first length; in the intermediate conformation, said first portion extends along at least part of the first conveyor (15) and at least part of the second active portion (19) and has a third length, which is greater than the first length and smaller than the second length.

10.— The plant according to any one of aspects from 7 to 9, wherein said moving assembly (17) is designed to move said second conveyor (16) relative to the respective first conveyor (15); the first conveyor (15) being mounted in a substantially fixed manner; said variable length stretch (11; 12) has a first end and a second end, which is arranged in a lower position relative to the first end of the variable length stretch (11; 12); in particular, the first conveying assembly (14) is configured to convey said first articles (3) or said second articles (7) from the first end of the first variable length stretch (11; 12) to the second end of the variable length stretch (11; 12).

11.— The plant according to any one of aspects from 7 to 10, wherein said first conveyor (15) is arranged above said second conveyor (16); said first active portion (18) and said second active portion (19) extend starting from one end (20) of the first conveyor (15).

12.— The plant according to any one of aspects from 7 to 11, wherein said first conveyor (15) is a substantially linear conveyor designed to move said first articles (3) or said second articles (7) in a first direction (A); said second conveyor (16) is a substantially linear conveyor designed to move said first articles (3) or said second articles (7) in the first direction (A); said moving assembly (17) is designed to move the second conveyor (16) in the first direction (A) and in a second direction (B), which is opposite the first direction (A).

13.— The plant according to any one of aspects from 7 to 12, wherein at least one (in particular, only one) between the first conveying system (2) and the second conveying system (6) comprises at least the first conveying assembly (14) and a second conveying assembly (CG);

the first conveying assembly (14) is designed to move said first articles (3) or said second articles (7) in a first direction (A), the second conveying assembly (CG) is designed to move said first articles (3) or said second articles (7) along a second portion of said first stretch (11) and of said second stretch (12), respectively, in a second direction (B), which is substantially opposite the first direction (A).

14.— The plant according to any of aspects from 7 to 13, wherein at least one (in particular, only one) between the first conveying system (2) and the second conveying system (6) comprises at least the first conveying assembly (14) and at least one respective further first conveying assembly (14'); said first conveying assembly (14) is designed to move said first articles (3) or said second articles (7) in a first direction (A), the further first conveying assembly (14') is designed to move said first articles (3) or said second articles (7) along a further portion of said first stretch (11) or of said second stretch (12), respectively, in a second direction (B), which is substantially opposite the first direction (A).

15.— The plant according to aspect 14, wherein the further first conveying assembly (14') is defined as said first conveying assembly (14); in particular, the further first conveying assembly (14') comprises a further first conveyor (15), a second further conveyor (16) and at least one further moving assembly (17) for moving at least one of the further first conveyor (15) and the further second conveyor (16) relative to one another between a first conformation, in which the further first conveyor (15) and the further second conveyor (16) at least partially overlap one another, and a second conformation, in which the further second conveyor (16) has a further first active portion (18), which is offset from said further first conveyor (15), passing through at least one further intermediate conformation, in which said further first conveyor (15) and said further second conveyor (16) at least partially overlap one another and said further second conveyor (16) has a further second active portion (19), which is offset from said further first conveyor (15) and is shorter than said further first active portion (18); the further first conveying assembly (14) is (at least partially) arranged in higher position relative to (above) said first machine (5).

16.— The plant according to any one of aspects from 7 to 15, wherein at least one (in particular, only one) between the first conveying system (2) and the second conveying system (6) comprises at least the first conveying assembly (14) and a guide device (23), which is designed to allow said first articles (3) or said second articles (7) to move between said first conveying assembly (14) and said second conveying assembly (CG) or said further first conveying assembly (14') and define a bend of said first stretch (11) and of said second stretch (12), respectively; in particular, each guide device (23) comprises a first curved guide (24) delimiting said bend on the outside; in particular, the bend of said first stretch (11) and/or, respectively, of said second stretch (12) is of approximately 180°.

17.— The plant according to aspect 16, wherein each guide device (23) is integral with a respective second conveyor (16) and is arranged in the area of one end of said respective second conveyor (16).

The invention claimed is:

1. A transport assembly for transporting different types of articles of the smoking products manufacturing industry; the transport assembly (1) comprises: a first conveying system (2) for feeding first articles (3) of the smoking products manufacturing industry along a first conveying path (P1) to a first input station (4) of a first machine (5); and a second conveying system (6) for conveying second articles (7) of the smoking products manufacturing industry along a second conveying path (P2) from a first output station (8) of the first machine (5) to a second input station (9) of a second machine (10);

the transport assembly (1) is characterized in that:

the first conveying system (2) is configured to change the length of a first stretch (11) of the first conveying path (P1);

the second conveying system (6) is configured to change the length of a second stretch (12) of the second conveying path (P2);

the first conveying system (2) and the second conveying system (6) are mutually arranged so that the first stretch (11) and the second stretch (12) at least partially overlap one another and/or are side by side.

2. The transport assembly according to claim 1, comprising a frame (F) on which the first conveying system (2) and the second conveying system (6) are mounted.

3. The transport assembly according to claim 1, comprising a control unit (22) configured to control the first conveying system (2) and the second conveying system (6), to change the length of the first stretch (11) of the first conveying path (P1) and of the second stretch (12) of the second conveying path (P2).

4. The transport assembly according to claim 1, wherein the first conveying system (2) and/or the second conveying system (6) each comprise/s at least one respective first conveying assembly (14), which is configured to convey said first articles (3) and said second articles (7), respectively, along at least a first portion of said first stretch (11) and of said second stretch (12), respectively;

wherein the first conveying assembly (14) comprises a first conveyor (15), a second conveyor (16) and at least one moving assembly (17) to move at least one between the first conveyor (15) and the second conveyor (16) relative to one another between a first conformation, in which the first conveyor (15) and the second conveyor (16) at least partially overlap one another, and a second conformation, in which the second conveyor (16) has a first active portion (18), which is offset from said first conveyor (15), passing through at least one intermediate conformation, in which said first conveyor (15) and said second conveyor (16) at least partially overlap one another and said second conveyor (16) has a second active portion (19), which is offset from said first conveyor (15) and is shorter than said first active portion (18).

5. The transport assembly according to claim 4, wherein, in the first conformation, said first portion has a first length; in the second conformation, said first portion extends along at least part of the first conveyor (15) and at least part of the first active portion (18) and has a second length, which is greater than the first length; in the intermediate conformation, said first portion extends along at least part of the first conveyor (15) and at least part of the second active portion (19) and has a third length, which is greater than the first length and lesser than the second length.

6. The transport assembly according to claim 4, wherein said moving assembly (17) is designed to move said second conveyor (16) relative to the respective first conveyor (15); the first conveyor (15) being mounted in a substantially fixed manner; said first stretch (11) has a first end and a second end, which is arranged in a lower position than the first end of the first stretch (11); the first conveying system (2) is configured to convey said first articles (3) from the first end of the first stretch (11) to the second end of the first stretch (11); the second stretch (12) has a first end and a second end, which is arranged in a lower position relative to the first end of the second stretch (12); the second conveying system (6) is configured to convey said second articles (7) from the first end of the second stretch (12) to the second end of the second stretch (12).

7. The transport assembly according to claim 4, wherein said first conveyor (15) is arranged above said second conveyor (16); said first active portion (18) and said second active portion (19) extend starting from the end (20) of the first conveyor (15).

8. The transport assembly according to claim 4, wherein said first conveyor (15) is a substantially linear conveyor designed to move said first articles (3) or said second articles (7) in a first direction (A); said second conveyor (16) is a substantially linear conveyor designed to move said first articles (3) or said second articles (7) in the first direction (A); said moving assembly (17) is designed to move the second conveyor (16) in the first direction (A) and in a second direction (B), which is opposite the first direction (A).

9. The transport assembly according to claim 4, wherein:
said first conveying system (2) and/or said second conveying system (6) each comprise/s at least one respective second conveying assembly (CG);
the first conveying assembly (14) is designed to move said first articles (3) or said second articles (7) in a first direction (A), the second conveying assembly (CG) is designed to move said first articles (3) or said second articles (7) along a second portion of said first stretch (11) and of said second stretch (12), respectively, in a second direction (B), which is substantially opposite the first direction (A).

10. The transport assembly according to claim 4, wherein said first conveying system (2) and/or said second conveying system (6) each comprise/s at least one respective further first conveying assembly (14'); said first conveying assembly (14) is designed to move said first articles (3) or said second articles (7) in a first direction (A); the further first conveying assembly (14') is designed to move said first articles (3) or said second articles (7) along a further portion of said first stretch (11) or of said second stretch (12), respectively, in a second direction (B), which is substantially opposite the first direction (A).

11. The transport assembly according to claim 9, wherein said first conveying system (2) and/or said second conveying system (6) each comprise/s at least one respective guide device (23), which is designed to allow said first articles (3) or said second articles (7) to move between said first conveying assembly (14) and said second conveying assembly (CG) or said further first conveying assembly (14') and to define a bend of said first stretch (11) and of said second stretch (12), respectively; wherein, each guide device (23) comprises a first curved guide (24) delimiting said bend on the outside; and the bend of said first stretch (11) and/or of said second stretch (12), respectively, is of approximately 180°.

12. The transport assembly according to claim 11, wherein each guide device (23) is integral with a respective second conveyor (16) and is arranged in the area of one end of said respective second conveyor (16).

13. A plant of the smoking products manufacturing industry; the plant (13) comprises:
the transport assembly (1) according to claim 1;
said first machine (5), which is configured to treat said first articles (3) of the smoking products manufacturing industry and to obtain said second articles (7) of the smoking products manufacturing industry;
and said second machine (10).

14. The plant according to claim 13, wherein the first conveying system (2) and the second conveying system (6) are arranged in a higher position relative to the first machine (5) and/or the second machine (10).

* * * * *